Feb. 16, 1954  V. B. LAZERUS  2,669,176
AIR PUMP FOR FOOD CONTAINERS
Filed June 22, 1951

INVENTOR
VERNON B. LAZERUS,
BY
McMorrow, Berman & Davidson
ATTORNEYS

Patented Feb. 16, 1954

2,669,176

UNITED STATES PATENT OFFICE 2,669,176

AIR PUMP FOR FOOD CONTAINERS

Vernon B. Lazerus, Galveston, Tex.

Application June 22, 1951, Serial No. 232,973

1 Claim. (Cl. 99—270)

This invention relates to food containers or receptacles and more particularly to a food container having a manually operated air pump for producing a fluid pressure in the container different from atmospheric pressure.

It is among the objects of the invention to provide an improved container for perishable material, such as ground coffee, smoking tobacco, spices, cakes or cookies, nut meats, et cetera, which receptacle is provided with a manually operated air pump for producing an air pressure in the container different from the pressure of the atmosphere; which air pump, in one arrangement, is capable of producing a partial vacuum in the container and, upon a reversal of its valves, to provide an alternative arrangement, is capable of producing an air pressure in the container above atmospheric pressure; which provides a pump which is easily operated by finger pressure; and which is simple and durable in construction, economical to manufacture, positive and effective in operation, and neat and attractive in appearance.

Other objects and advantages will become apparent from a consideration of the following description and the appended claims in conjunction with the accompanying drawing wherein:

Figure 1:
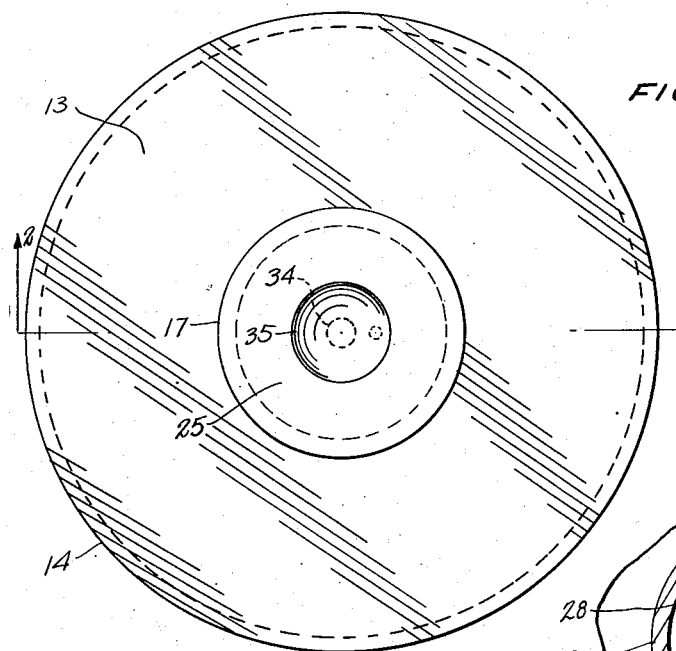
Figure 1 is a top plan view of a container and air pump assembly illustrative of the invention.
Figure 3:
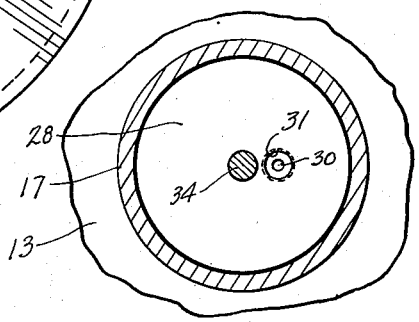
Figure 3 is a cross sectional view on the line 3—3 of Figure 2.
Figure 2:
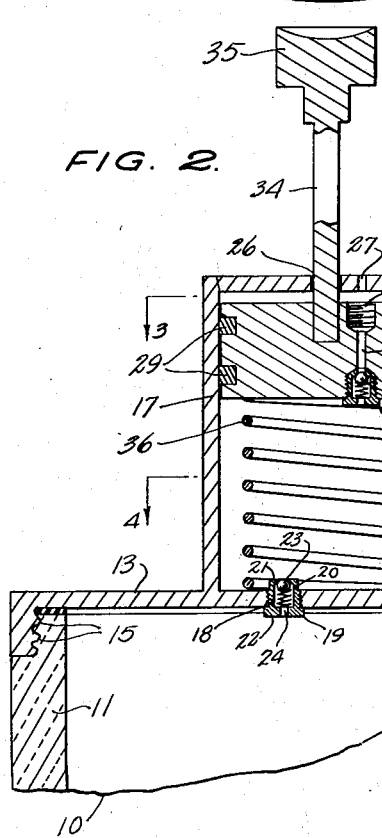
Figure 2 is a cross sectional view on the line 2—2 of Figure 1.
Figure 4:
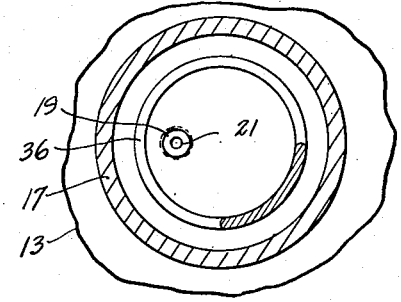
Figure 4 is a cross sectional view on the line 4—4 of Figure 2.

With continued reference to the drawing, a container 10 is illustrated as having a substantially cylindrical side wall portion 11 terminating in an open container end and provided at the open end of the container with external screw threads 12. A cover 13 in the form of a flat circular plate is disposed in closing relationship to the open end of the container 10 and is provided with a peripheral flange 14 having internal screw threads 15 which engage with the threads 12 on the container to releasably secure the cover on the container. A sealing gasket 16 of suitable gasket material is disposed between the end of the side wall 11 of the container and the adjacent surface of the cover 13 to provide an air tight seal between the cover and the container.

A pump cylinder 17 is secured at one end to the cover 13 at the side of the cover remote from the flange 14 and extends substantially perpendicular from the cover. A hole 18 is provided in the cover within the area of the pump cylinder and communicates with the interior of the pump cylinder and the interior of the container 10. This hole is screw threaded and a check valve assembly 19 is threaded into the hole. This check valve assembly includes an externally screw threaded, cylindrical housing 20 having end walls 21 and 22 each provided with an aperture and having a cavity therein of greater diameter than the apertures in the end walls. A valve ball 23 is disposed in the housing in seating relationship to the aperture in the end wall 21 and a compression spring 24 is disposed in the housing between the valve ball 23 and the end wall 22 to resiliently urge the ball into seating engagement with the end wall 21.

In the arrangement illustrated, the check valve 19 permits the passage of air from the pump cylinder into the container while precluding passage of air out of the container into the pump cylinder. It is apparent that if this valve were reversed relative to the cover 13, it would permit the passage of air out of the container into the pump cylinder, and preclude the passage of air into the container. Thus, with the first arrangement, the valve is effective to permit a pressure greater than atmospheric pressure to be built up in the container, while in the second suggested arrangement, it is effective to permit a partial vacuum to be produced in the container.

An end wall 25 is provided at the end of the cylinder 17 remote from the cover 13, and this end wall is provided with a centrally located opening 26 and a vent opening 27 spaced from the opening 26.

A piston 28 is disposed in the cylinder and is slidable between the end of the cylinder joined to the cover 13 and the cylinder end wall 25 and is provided with peripheral grooves receiving packing rings 29 of suitable packing material.

An aperture 30 extends through the piston from one end to the other thereof and is provided at its opposite ends with internally screw threaded counterbores 31 and 32.

In the arrangement illustrated, a check valve assembly 33, similar in all respects to the assembly 19, described in detail above, is threaded into the counterbore 32 in the end of the piston adjacent the cover 13.

A stem or plunger 34 extends from the piston 28 through the opening 26 in the cylinder end wall 25 and a hand knob 35 is mounted on the end of this stem remote from the piston.

A compression spring 36 is disposed in the cylinder between the cover 13 and the end of the piston adjacent the cover and resiliently urges the piston toward the outer end wall 25 of the cylinder.

The check valve 33 is arranged to permit the passage of air through the piston aperture 30 as the piston is moved away from the cover 13 and to preclude the passage of air through this aperture when the piston is moved toward the cover. With this arrangement, when manual pressure on the knob 35 forces the piston toward the cover 13 against the force of spring 36 the air in the space within the cylinder between the piston and the cover 13 will be compressed and forced through the valve 19 into the container. When the pressure on the knob 35 is released, the spring 36 will move the piston away from the cover and additional air will flow through the aperture 30 and past the valve 33 into the space between the piston and the cover, this air flowing into the cylinder through the vent opening 27 in the cylinder end wall 25. When the piston is again moved toward the cover by manual pressure on this knob 35, the additional air will be forced through the valve 19 into the container and by repeating this operation, the air pressure in the container can be built up to a predetermined value above atmospheric pressure.

The valves 33 and 19 both pass air in the same direction and, if the valve 19 were reversed, the valve 33 would be reversed in position and threaded into the counterbore 31 at the end of the piston remote from the cover, so that it would pass air in the same direction as the reverse valve 19. With this arrangement, when the piston was forced toward the cover by manual pressure on the knob 35, air in the space within the cylinder between the piston and the cover would be forced through the aperture 30 in the piston and upon release of the manual pressure on the knob 35, the spring 36 would force the piston toward the end wall 25, forcing this air out of the cylinder through the vent opening 27 and drawing additional air into the cylinder between the piston and the cover 13 through the valve 19 from the container. Upon continuation of this operation a partial vacuum would be produced in the container.

The cylinder is preferably permanently secured at one end to the cover 13 and the end wall 25 is preferably permanently secured in the cylinder, so that the valve arrangement will be predetermined by the manufacturer at the factory, rather than being changeable by a purchaser of the device.

A petcock 37 is mounted in an aperture in the cover 13 spaced from the pump cylinder 17, so that the pressure in the container can be equalized with the atmospheric pressure whenever it is desired to remove the cover from the container.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A combination container and pump structure formed for selected reversal of component parts thereof to provide each of a vacuum producer and an air compressor, said structure comprising a hollow receptacle body; a cover therefore; a pump cylinder attached at one end to the cover and continuously vented to atmosphere at its other end; a check valve assembly mounted in the cover in the area covered by the pump cylinder to control passage of air between the interior of the receptacle body and the interior of the cylinder at the first-named end of the cylinder, said check valve assembly having a connection to the cover permitting end for end reversal of the check valve assembly in place; a piston working in the cylinder between the ends thereof and having an aperture extending from one to the other end thereof, the opposite ends of said aperture being formed with threaded counterbores; and a check valve assembly mounted in said piston to control passage of air between the interior of the vented end of the cylinder and said first-named end thereof, said second-named check valve assembly including an externally screw-threaded, cylindrical housing having end walls each provided with an aperture and having a cavity greater in diameter than either of the apertures of the end walls, a valve ball disposed in the cavity in seating relationship to the aperture of one of said end walls, and a spring compressed between the valve ball and the other end wall to normally bias the valve ball to a seated position, said housing being threadable into either of said counterbores for reversal of said second check valve assembly in said piston.

VERNON B. LAZERUS.

References Cited in the file of this patent

UNITED STATES PATENTS

| Number | Name | Date |
|---|---|---|
| 168,888 | Ellis | Oct. 19, 1875 |
| 328,673 | Heinig | Oct. 20, 1885 |
| 716,090 | Nyberg | Dec. 16, 1902 |
| 865,022 | Dorment | Sept. 3, 1907 |
| 1,635,815 | Briggs | July 12, 1927 |
| 2,036,007 | Wheatley et al. | Mar. 31, 1936 |
| 2,055,390 | Rouch | Sept. 27, 1936 |

FOREIGN PATENTS

| Number | Country | Date |
|---|---|---|
| 886,540 | France | July 5, 1943 |